Dec. 8, 1964    L. D. BARLEY    3,160,048
SERVO CONTROLLED CLAMP
Filed Oct. 2, 1961    3 Sheets-Sheet 1
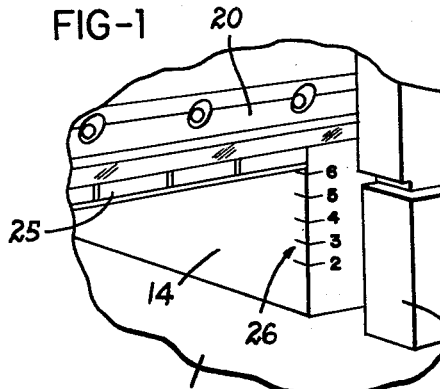
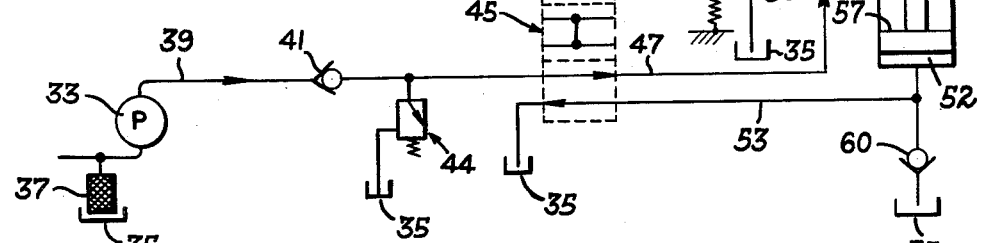
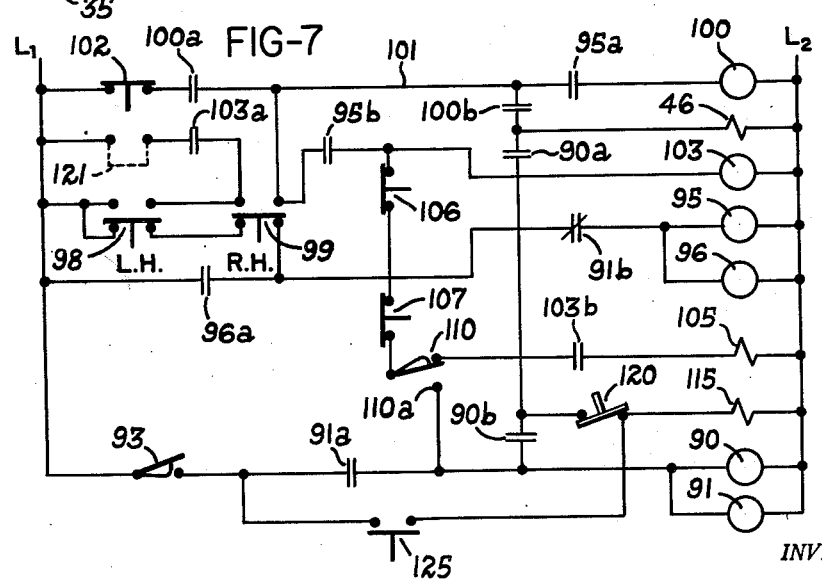
INVENTOR.
LEO D. BARLEY
BY
Marechal, Biebel, French & Bugg
ATTORNEYS Dec. 8, 1964 L. D. BARLEY 3,160,048
SERVO CONTROLLED CLAMP
Filed Oct. 2, 1961 3 Sheets-Sheet 2
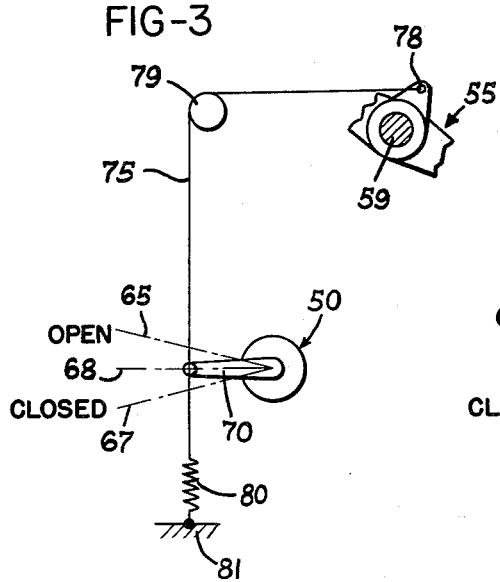
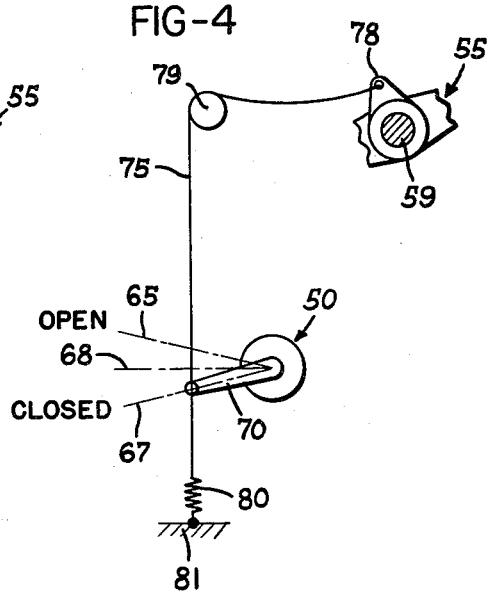
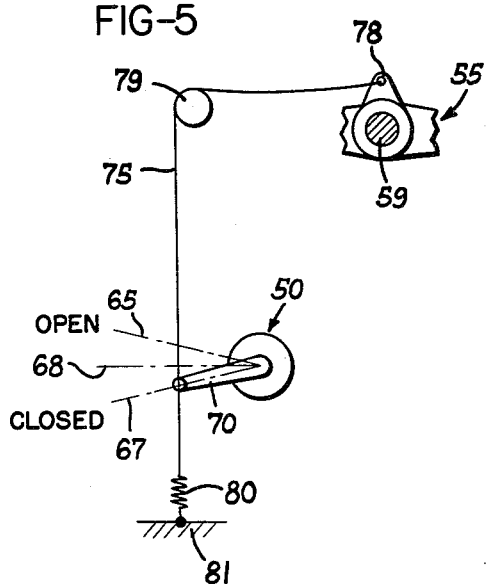
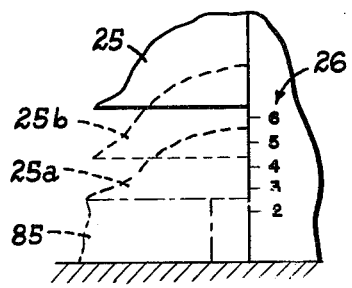
INVENTOR.
LEO D. BARLEY
BY
Marechal, Biebel, French & Bugg
ATTORNEYS Dec. 8, 1964   L. D. BARLEY   3,160,048
SERVO CONTROLLED CLAMP
Filed Oct. 2, 1961   3 Sheets-Sheet 3

INVENTOR.
LEO D. BARLEY
BY
Marechal, Biebel, French & Bugg
ATTORNEYS

United States Patent Office 3,160,048
Patented Dec. 8, 1964

3,160,048
SERVO CONTROLLED CLAMP
Leo D. Barley, Dayton, Ohio, assignor to Harris-Intertype Corporation, Cleveland, Ohio, a corporation of Delaware
Filed Oct. 2, 1961, Ser. No. 142,250
5 Claims. (Cl. 83—390)

This invention relates to machines for cutting paper and the like, and more particularly to a novel clamp control assembly for a hydraulically operated clamp mechanism.

In cutting machines adapted to cut various size stacks or piles of paper, or other sheet material, which may be of varying thickness or height, the pile is held in position for the cutting stroke by a clamp member prior to the cutting action of the knife. With the pile thus engaged by the clamp, a knife blade mounted in front of the clamp moves down in a guillotine-like cutting stroke to sever the pile along a preselected cutting plane. After the cutting cycle is complete, the clamp and knife move to an upper or raised position, and the machine is ready for the next clamping and cutting cycle.

The clamp member itself is normally a relatively heavy metallic element which is brought down into contact with the surface of the pile, and hydraulic pressure developed through a suitable power unit is employed to maintain the clamp in contact with the surface of the pile for holding the paper during the stroke of the knife. At approximately the same time that the knife is removed from the pile during the upward stroke thereof, the clamp is moved to a raised position by an appropriate control system. As the clamp reaches its limit of travel in the upward direction after a clamping and cutting cycle, a limit switch, normally a microswitch, is activated which is operative to by-pass the hydraulic unit for the clamp member, and the clamp is maintained in the raised position by the minimum pressure maintained in the clamp hydraulic system.

Microswitches which are contacted by the clamp, to halt the upward travel thereof, function in a satisfactory manner for relatively long periods of time, however, after prolonged use, the microswitches may exhibit an inherent tendency to wear during normal operation. When operation of the microswitch becomes erratic, a condition can result in which the clamp may oscillate or "hunt," to some extent, in the upper terminal position, resulting from the fact that the microswitch actuates prematurely and the clamp is halted near the extreme upper position of its travel. The microswitch controls the operation of the clamp hydraulic unit which may be prematurely deenergized and the microswitch may be disengaged reactivating the hydraulic unit and the clamp moves upward a small amount hunting for the true upper position.

An additional consideration effecting the operation of microswitches for controlling the upper position of the clamp relates to the structure of the clamp member itself, which is a relatively heavy element in comparison to the knife, for example. If it is considered that the clamp is maintained in the raised position due to pressure which is maintained in the clamp hydraulic unit, it can be understood that with clamps of different weights, the clamps will be halted at different positions if the same given quantity of pressure is maintained in the clamp hydraulic system for each of the different clamps of different weight. For example, and in no way to be construed as a limitation with respect to this invention, if a hydraulic unit develops about 160 pounds of pressure for maintaining the clamp in a raised position, a clamp weighing 500 pounds will be raised to a different level than a clamp weighing 495 pounds, for example. In order to provide cutters wherein each clamp in each machine is positioned the same distance above a work table, it is necessary either to construct the clamps, or place weights on the clamps, so that each has the same gross weight, or adjust the hydraulic unit of each machine so that it is capable of holding a particular clamp at the prescribed raised position. Either of these alternatives is undesirable from a manufacturing standpoint and may involve considerable manpower to complete the necessary adjustments.

In the case of the knife member, the situation is somewhat analogous to that encountered with the clamp except for safety reasons the knife must be raised to a position such that the cutting edge thereof is not exposed below the lower edge of the clamp. Additionally, during idling periods of the cutter, the knife must be maintained in the raised position and prevented from descending.

Accordingly, it is a primary object of this invention to provide a control assembly capable of automatically positioning and maintaining a relatively heavy member at a given point above a reference plane.

Another object of this invention is to provide a clamp control for a power operated cutter of the type described wherein a clamp member is automatically positioned and maintained at a terminal raised position above the work table of the cutter.

It is another object of this invention to provide a control assembly for positioning a relatively heavy member at a terminal position above a reference plane by establishing a pressure equilibrium condition as the member reaches the terminal position, and wherein the pressure equilibrium condition is operative to maintain the member at that terminal position with respect to the reference plane.

A further object of this invention is the provision of a control assembly for use with power operated cutters of the type above described wherein the movement of a member is sensed by a control unit operative to establish a pressure equilibrium condition capable of halting and maintain the member at a terminal position a given distance above the work table of the cutter.

It is a further object of the invention to provide a control assembly for use in cutters of the type described for positioning a clamp and knife member at a terminal raised position above a reference plane by establishing a pressure equilibrium condition as the members reach the terminal position, and wherein the pressure equilibrium condition is operative to maintain the members at the terminal raised position.

A still further object of the present invention is the provision of a power operated cutter and the like having a knife and clamp member wherein each member is controlled by a separate control assembly employed to maintain each member automatically positioned at a terminal raised position.

Other objects and advantages of the invention will be apparent from the following description, the accompanying drawings and the appended claims.

In the drawings—

FIG. 1 is a fragmentary perspective view of a knife blade, clamp and work table of a cutter of the type to which this invention relates;

FIG. 2 is a somewhat diagrammatic view of the clamp control assembly and clamp hydraulic control system;

FIGS. 3 to 5 are schematic views of the clamp control assembly showing relative positions of the several elements thereof;

FIG. 6 is a schematic view of the clamp positioned at various positions above the work table;

FIG. 7 is a schematic diagram of the electrical circuit employed with the control assembly of this invention;

Figure 8:
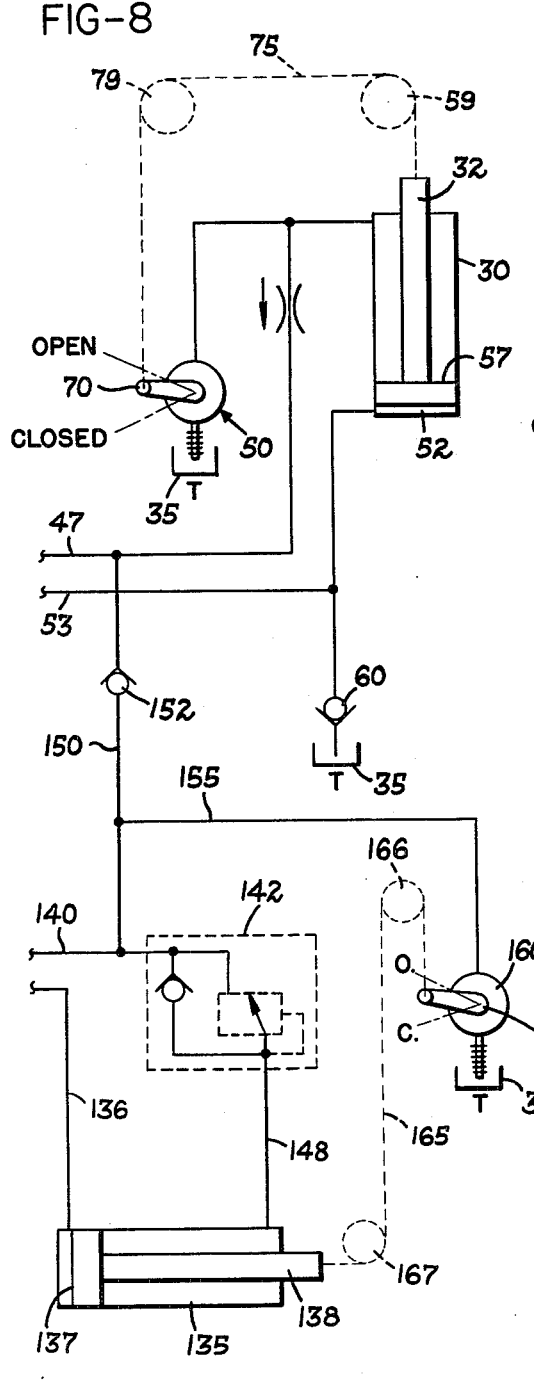
FIG. 8 is a somewhat diagrammatic view of a portion of a hydraulic system wherein separate control assemblies are employed to maintain the knife and clamp members automatically positioned.

Referring to the drawings, which illustrate a preferred embodiment of the present invention, FIG. 1 is a fragmentary view of a cutter assembly including a work table 10 and one set of side members 14 and 16 defining therebetween a vertical guideway for the travel of the knife member 20 which is positioned generally to the front of a clamp member 25. Arranged along one side of the frame 16 are a series of index marks, generally indicated at 26, which serve to indicate the height of a particular pile of material and the relative position of the clamp above the work table.

The clamp 25 is moved from a first or terminal raised position above a reference plane, which is usually a work table, to a second or lower position in engagement with a stack or pile of material positioned on the work table. Power means or a pressure fluid operated pump 33 as shown in FIG. 2 are provided for supplying fluid under pressure to the clamp cylinder 30 having a piston 32 or other output member capable of moving in first and second directions to effect movement of the clamp from the raised position to the lower position in engagement with the pile.

The hydraulic pump 33 draws liquid from a tank or return system 35 through a filter 37 and feeds the pressurized fluid into conduit 39. Positioned on the downstream side of a check valve 41 is an adjustable clamp pressure control unit 44 operative to provide the proper pressure for the clamping operation. Excessive pressure is vented through the valve 44 to the return system 35, as is well known in the art.

Pressurized fluid flows to a clamp directional valve 45 operated by a solenoid 46, or a mechanical control mechanism (not shown), to position the valve, which in the normal rest position is spring biased to allow flow of liquid to conduit 47. Pressurized fluid flows from conduit 47 through a T-connection 49 which directs the fluid to one side of the cylinder 30 and to a servo control valve 50, whose operation will be discussed more fully hereinbelow.

As shown in FIG. 2, the clamp is in the raised position, and the fluid on the back side 52 of the piston 32 is capable of flowing through conduit 53 and through the valve 45 to the return or tank system 35. As valve 45 is switched into the clamp-down position by an appropriate signal, described below, pressurized fluid is ported from conduit 39 to conduit 53, while conduit 47 is connected to the return system 35. Interconnecting the piston 32 and the clamp 35 is a linkage assembly 55 which translates the linear motion of the piston 32 into rotary motion for effecting a generally vertical movement of the clamp 25. The details of the linkage assembly 55 are shown in copending application Serial No. 142,314, filed of even date herewith and assigned to the same assignee.

In moving downward during a clamping operation, the pressure on face 57 of the piston 32 is relieved by connecting conduit 47 to the return system 35, and initially the weight of the clamp and associated linkage operate to cause a driving link or rocker 58 to rotate about the driving rod or shaft 59, moving the piston 32 in the cylinder. This movement of the piston creates a suction which draws liquid out of the return system 35 through a check valve 60, permitting the cylinder 30 to fill rapidly. Such an arrangement is provided because the flow for pressure build-up to full clamping pressure in conduit 53 and the cylinder 30 is relatively slow in comparison to the rate of movement of piston 32 due to the weight of the clamp. At approximately the same time that the clamp reaches the surface of the pile, pressure is supplied to the back side 52 of the piston, the cylinder 30 being substantially filled with fluid drawn through the check valve 60 at relatively low pressure, and full clamping pressure is applied to the piston 32 according to the setting on the valve 44. After the cutting action of the knife 20, the directional valve 45 is repositioned as shown in FIG. 2, and the clamp is moved upward and halted in the raised position by the control assembly of the present invention.

Referring to FIGS. 3 to 6, which illustrate the operation of the control assembly in accordance with the present invention, the servo valve 50 is shown as having three positions, open as indicated at 65, closed as indicated at 67, and a partially open position 68 intermediate the open and closed positions. The partially open position is shown arbitrarily for purposes of explanation. It is in actuality that position in which the valve passes a sufficient flow with regard to the pump supply pressure and flow capacity, to maintain pressure in line 47 sufficient to hold the clamp fully raised. An arm 70 is provided on the servo valve 50 for moving it between the various positions previously indicated.

Shifting of the valve 50 into the several positions is controlled by a sensor assembly including a cable 75 of fixed length secured at one end to an adapter 78 attached to the driving shaft 59 and rotatable therewith. The cable 75 passes over an idler pulley 79 and is secured to the arm 70 effecting movement thereof as the driving shaft 59 rotates for moving the clamp 25. A spring 80, or other suitable means, is affixed to the other end of the cable and to a non-movable member 81 of the cutter for urging the valve 50 toward the closed position. With the clamp 25 in the terminal raised position, for example six (6) inches above the work table (FIG. 6), the elements of the clamp control assembly will occupy the relative positions shown generally in FIGS. 2 and 3. The valve 50 is partially open and an equilibrium condition is established between the weight of the clamp 25 and associated linkage and the pressure on face 57 of the piston 32. With the clamp directional valve 45 in the clamp-up position, pressurized fluid flows through the T-connection 49 and into the cylinder 30. The pressure developed in the cylinder is that required to maintain the clamp 25 in the raised position, and excess flow at that pressure is passed through the valve 50 to the return system 35 as shown in FIG. 2.

As the clamp control valve is switched into the clamp-down position by a suitable control signal, conduit 47 is connected to the return system 35 and the clamp moves down rotating the driving rod 59. Movement of the driving rod 59 allows cable 75 to play out, since the distance between pulley 79 and the tip end of the adapter 78 is progressively decreased and the spring 80 operates to urge the arm 70 of the valve 50 into the closed position as shown in FIG. 4. It should be noted that the valve 50 need not be in the closed position during a clamping operation since conduit 47 acts solely as a low pressure return line during the downward movement of the clamp at the start of such a cycle. As the clamp reaches a position 25a (FIG. 6) in engagement with the surface of a pile 85, the valve 50 remains in the closed position 67 in preparation for the upward movement of the clamp, as shown in FIG. 4.

At approximately the same time the trailing edge of the knife leaves the surface of the pile 85 subsequent to a cutting stroke, the clamp directional valve 45 is shifted into the clamp-up position, and pressure is then applied to conduit 47 reversing the movement of piston 32 in the cylinder. The movement of the piston 32 causes rotation of the driving rod 59 resulting in decreasing slack in the cable 75 as may be observed by comparing FIGS. 4 and 5, and the clamp moves upward to a position 25b as shown in FIG. 6. The pressure on the face 57 of the piston is sufficient to raise the clamp against its own weight, and as the clamp continues upward and reaches the terminal raised position, the arm 70 of the valve 50 shifts from the closed position 67 (FIG. 5) to the partially open position 68 (FIG. 3). At approximately the same time the clamp reaches the desired position, it is halted and sufficient pressure is maintained on the face 57 of the piston 32 to support the weight of the clamp in the raised position.

Should the upward momentum carry the clamp above the terminal raised position, the servo valve is moved farther open, toward position 65 and the pressure on the side 57 of the piston decreases allowing the clamp to move downwardly until the equilibrium condition above described is established. In this manner, the control assembly operates to halt the upward movement of the clamp and maintain the clamp immovable at the raised position.

As will be apparent from the above discussion, the raised position of the clamp is determined by the weight of the clamp and associated linkage and the pressure on the face 57 of the piston 32. By adjusting the clamp control assembly such that the servo valve 50 is in the partially open position 67 as the clamp reaches the desired position, this system is capable of automatically compensating for the difference in clamp weight from one machine to the next. The terminal raised position is a fixed setting established during manufacture of a machine, and is normally approximately six (6) inches above the work table as shown in FIGS. 1 and 6.

Adjustment of the control assembly to vary the raised position of the clamp may be made by adjusting the effective distance or length of the cable 75 between the idler pulley 79 or arm 70 and the point 78. Such an adjustment may be conveniently carried out by employing a turn-buckle, or the like, attached to the adapter 78. As can be understood, this adjustment of the effective length of the cable operates to accomplish shifting of that point of partial opening of valve 50 at which the equilibrium condition is established with an accompanying movement in the clamp.

To vary the raised position of the clamp, the overall length of the cable 75 may be lengthened to move the arm 70 from the cracked or partially open position 68 toward the closed position 67. This operates to increase the pressure working on face 57 of the piston 32 resulting in upward movement of the clamp until the arm 70 of valve 50 is again positioned in the proper partially open position 68.

To lower the raised position of the clamp, the overall length of cable 75 is decreased allowing the arm 70 to move from position 68 toward the full open position 65 resulting in a downward movement of the clamp until the arm 70 is again in the proper partially open position 68. Once adjusted, the clamp control assembly operates to halt the clamp at this new terminal position and maintain the clamp immovable at that raised position until an appropriate clamp-down signal is received by the clamp valve 45.

Suitable control signals causing movement of the clamp directional valve 45 may be produced from an electrical circuit shown schematically in FIG. 7, including multiple parallel circuits connected between power input lines L1 and L2. For a description of the circuits, it is assumed that the knife and clamp are in raised position, with relays 90 and 91 deenergized as a result of knife control switch 93 being opened due to engagement of the switch by the knife drive mechanism in a raised position. The details of operation and location of this switch are disclosed in Serial No. 142,314 filed of even date herewith and assigned to the same assignee as this application.

Switch 93 is normally closed and adapted to be opened as the knife moves to the fully raised position. With relays 90 and 91 deenergized, contacts 90a, 90b and 91a are opened while contact 91b is closed. Closing of contact 91b energizes relays 95 and 96 since a circuit is completed from L1 through the back contacts of switches 98 and 99 through the normally closed contacts 91b to L2. Switches 98 and 99 are manually operated switches controlled by left and right hand operated handles employed to initiate a clamp and cutting cycle as disclosed in detail in Serial No. 142,314 previously mentioned. With relays 95 and 96 energized, contacts 95a, 95b are closed as well as 96a, which when closed operates to lock relays 95 and 96 in the circuit. The circuit is now in condition for a clamping and cutting cycle.

To initiate the cycle, switches 98 and 99 are closed by operation of suitable safety handles or buttons, and because relay 95 is energized, contacts 95a and 95b are closed energizing relay 100 by completing the circuit from L1 through the forward contacts of switches 98 and 99 through the line 101 to L2. Energizing relay 100 causes contacts 100a to close, since clamp release switch 102 is normally closed to lock the relay 100 into operation, while contacts 100b close energizing the clamp solenoid 46 controlling the clamp directional valve 45 to cause downward movement of the clamp. Switch 102 is in the nature of a manual override switch employed to deenergize relay 100 once that relay is locked into operation. Movement of switches 98 and 99 to the forward contacts also operates to energize relay 103 through the closed contacts 95b to close contacts 103a and 103b. Closing of these contacts energizes the "knife down" solenoid 105 resulting in control of an appropriate hydraulic circuit for causing downward movement of the knife.

The circuit between contacts 95b and 103b includes a pair of knife control switches 106 and 107 arranged electrically in series with the "knife down" relay 105 in order to prevent energizing that relay during the time that the knife blade is being repaired or replaced. The details, operation and location of these switches is disclosed more fully in United States patent to Russell I. Haywood 2,939,357, issued June 7, 1960. These switches are normally closed and adapted to open the circuit to the knife down relay 105 when the switches are open. In the "knife down" circuit there is located a normally closed "knife down" switch 110 which is momentarily opened as the knife blade reaches the conventional cutting stick. For detailed information relating to the physical location and operation of this switch, reference is made to said Serial No. 142,314.

As the "knife down" switch 110 is moved to the back contacts 110a, the relays 90 and 91 are energized since the circuit is complete from L1 through the switch 110 to L2 resulting in opening of contacts 91b and closing of contacts 90a and 90b. Once contacts 91b have opened, relays 95 and 96 are deenergized resulting in opening of their corresponding contacts which operate to deenergize relays 100 and 103, deenergizing the clamp control solenoid 46 and the "knife down" solenoid 105, while the "knife up" solenoid 115 is energized through the circuit from L1 through knife control switch 93, closed contacts 91a and 90b, and the normally closed stop down switch 120.

At this point the knife is being raised, and at approximately the same time that the trailing edge of the knife clears the surface of the paper, the clamp begins to move upward toward the terminal position. As soon as the knife starts its upward movement, the "knife down" switch 110 returns to its back contact, however, since contact 103b is opened because relay 103 is deenergized, the solenoid 105 is not energized. Once the knife reaches its raised position, switch 93 is opened, deenergizing relays 90 and 91 to allow closing of contact 91b and opening of contacts 90a and 90b, and the circuit is now in condition for the next clamping and cutting cycle.

It is to be noted that even if switches 98 and 99 remain engaged with the forward contacts, a repeating cycle will not be initiated automatically, since it is necessary to return both of these switches to their back contacts in order to energize relays 95 and 96 for the clamping and cutting cycle. In this manner, repeating cycles are prevented, and it is necessary in order to initiate a cycle that both these switches be returned to the back contacts.

If desired, a jumper 121 may be installed between L1 and contacts 103a in order to allow one hand operation of the cutter after the clamp and knife have moved downward to a position wherein it is virtually impossible for the operator to place his hand between the knife and cutting stick. In this mode of operation, the operator engages both the left and right hand switches to initiate a clamping and cutting cycle as previously described. Once relay 103 has been energized as a result of energization of relays 90 and 91 with the closing of the corresponding contacts, it is possible for the operator to release his left hand and control the cycle by maintaining the right hand handle engaged to place switch 99 against the forward contacts. As relay 103 is deenergized at the end of a clamping and cutting cycle, contacts 103a are opened, and it is necessary for the operator to return the switch 99 to the back contacts along with switch 98, which has been returned to the back contacts previously, in order to initiate the next cycle. The "stop down" switch 120 and the normally opened "jog-up" switch 125 are utilized primarily in connection with the knife knob switches 106 and 107 and for further information concerning their mode of operation, reference is made to Serial No. 142,314 and aforementioned U.S. Patent 2,939,357.

It is also possible in accordance with the present invention to utilize the novel control assembly previously described for maintaining the clamp and knife positively positioned at the terminal raised position. Referring to FIG. 8 wherein continuity of reference numerals has been maintained, a pressure fluid motor such as a hydraulic cylinder 135 is shown and a portion of the hydraulic power unit including conduit 136 which applies fluid under pressure to the face 137 of the knife piston 138 positioned within the cylinder. The remaining portion of the knife hydraulic unit may be of the type disclosed in Serial No. 142,314.

Fluid for raising the knife flows through conduit 140 and through a counter-balance valve 142 and through line 148 into the cylinder 135 to move the piston effecting an upward movement of the knife after the cutting stroke. Interconnecting the conduit 47 of the clamp system and conduit 140 of the knife system is a cross-over network or conduit 150 having a one-way check valve 152 therein which operates to allow flow from conduit 47 to 140 but prevent flow in the reverse direction. Conduit 155 is connected to line 150 at one end and at the other end to the knife servo control valve 160. The arm 161 of servo valve 160 is attached to cable 165 which in turn is affixed to the piston 138 or a portion of the driving linkage of the knife, in order to sense the position of the knife during upward movement thereof. The cable 165 moves over pulleys 166 and 167 much in the same fashion as described in connection with the cable shown in FIG. 2, but operates to sense the position of the knife member.

In operation, assuming that the knife and clamp are in the raised position, the clamp servo valve 50 and the knife servo valve 160 are positioned so as to establish a pressure equilibrium condition which supports the weight of the clamp and knife members, respectively, maintaining these members positioned at the terminal position. The cross-over network 150 operates to meter a sufficient amount of fluid under pressure therethrough for maintaining the knife in the raised position, and the excess over that required to maintain the knife in the raised position is returned to the return system 35.

As a clamping and cutting cycle is initiated, the clamp moves downward as previously described and the knife starts its downward movement. The initial downward movement of the knife causes the servo valve 160 to move to the closed position and fluid under pressure is introduced into the cylinder 135 through line 136, while conduit 148 and the counter-balance valve 142 receive passage of the fluid and of the cylinder directing it to conduit 140 and through the knife valve which in turn returns the fluid to the return system.

After the cut has been made, high pressure fluid flows through conduits 140 and 148 to raise the knife member. Movement of the knife linkage and the member itself is sensed by the servo valve 160 which moves to the partially open or cracked position at approximately the same time that the knife member reaches the terminal raised position. In similar fashion the clamp is raised according to the sequence previously described. The cross-over conduit 150 operates to provide a small amount of fluid under pressure maintaining the knife in the raised position. The servo valve 160 operates in a manner identical to valve 50, relying on the pressurized fluid flowing through conduits 150 and 155 to maintain the knife in the raised position.

Figure 9:
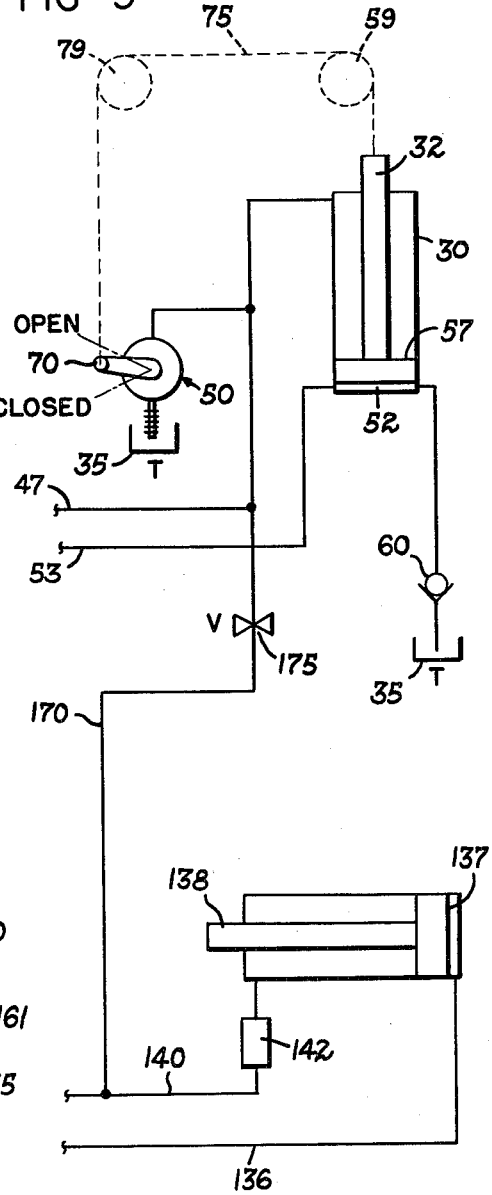
FIG. 9 is a somewhat diagrammatic view of a portion of hydraulic system wherein a single control assembly is employed to position both the knife and the clamp member.

It is also possible in accordance with the present invention to employ a single servo controlled valve for maintaining both the knife and the clamp in a terminal raised position. Referring to FIG. 9, a cross-over network or conduit 170 is provided between line 47 of the clamp system and conduit 140 of the knife system. A needle valve 175 is located in conduit 170 for controlling the pressure therein in order to provide sufficient pressure to support the weight of the knife. For example, if the knife and associated linkage have a weight of approximately 300 pounds, then the needle valve 175 is adjusted so that the pressure in conduit 170 is slightly in excess of 300 pounds. Should the knife or the clamp drift downward, there is always sufficient pressure available in lines 47 and 170 to raise the clamp and/or the knife to the terminal position. In this arrangement, the servo control 50 operates to establish a pressure equilibrium condition for both the clamp and knife assemblies and maintain these members at the terminal raised position and prevent drifting or downward movement of either of the members.

In accordance with the present invention, and because of the fact that the control assembly operates to establish an equilibrium condition wherein sufficient pressure is maintatined in the system to hold either the clamp, the knife or both members in the terminal raised position, the overall performance of the cutting machine has been improved considerably. A major advantage of the control assembly in accordance with this invention is the fact that the system is self-compensating insofar as the weight of each member is concerned and microswitches have been eliminated. That is to say, by adjusting the point at which the equilibrium condition is established, the control assembly operates to halt the member at the terminal position and maintain it raised at that position by establishing sufficient pressure in the cylinder to support the weight of the member and the associated linkage. Because of the fact that a hydraulic force is employed to raise the member and maintain it at the terminal position, it is possible by a relatively simple adjustment to compensate for the differences in weight of either the clamp or knife or both from one machine to another.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a cutting machine adapted to cut a pile of material of given length into piles of the same height and smaller length comprising a work table adapted to receive said pile of material, clamp means movable from a first position to a second position in engagement with said pile, pressure fluid operated drive means having an output member movable in opposite directions, means interconnecting said output member and said clamp for causing a movement of said clamp proportional to the movement of said output member, means connected to supply pressure fluid to said drive means causing movement of said output member, valve means operatively associated with said pressure supply means for flowing fluid to said drive means for moving said output member in said first and second directions effecting a movement of said clamp to said first and second positions respectively, a clamp control assembly including means to sense the position of said clamp, valve means controlling the pressure in said drive means as said output member moves to said first position, and said valve means connected to said sensing means to establish a fluid pressure condition in said drive means halting the movement of said output member in said first direction and maintaining said clamp in said first position.

2. A cutting machine adapted to cut a pile of material of given length into piles of the same height and smaller length comprising a work table adapted to receive said pile of material, clamp means movable relative to said work table for holding said pile of material in position to be cut by a cutting knife, fluid cylinder means having a piston movable between opposite ends of the cylinder and operatively connected to said clamp for raising and lowering said clamp, a fluid pump, fluid line means providing for fluid communication between each side of said cylinder and said pump, valve means in said fluid line means for controlling movement of the piston in reverse directions, said valve means being adapted to maintain that side of the piston which effects upward clamp movement under pressure when the clamp is in its raised position above the table, a control valve in said fluid line means communicating with the last named side of said piston, said control valve having open and closed positions and a partially open position intermediate said open and closed positions, movement of said control valve from its partially open position toward its open position serving to decrease pressure in the said fluid line means communicating with the last named side of said piston to enable descent of said clamp and movement from the partially open toward the closed position serving to increase pressure and thereby raise the clamp, said partially open position corresponding to any position of the clamp in which the fluid pressures on opposite sides of the piston are such as to maintain the clamp immovable in such position, and means operatively connecting the piston and control valve in a manner to effect partial opening of said control valve as said clamp reaches a terminal raised position.

3. In a cutter of the type described, the combination of a work table adapted to receive a pile of material to be cut, a clamp member movable from a terminal raised position to a lower position in engagement with the pile of material, knife means movable from a terminal raised position in a guillotine-type cutting stroke to sever said pile, a pair of pressure fluid operated drive means each having a movable output member, one of said output members effecting movement of said clamp into and out of engagement with said pile, the other of said output members effecting movement of said knife during a cutting stroke, means connected to supply pressure fluid to each side of each of said output members for effecting movement thereof, a pair of control assemblies each including sensing means and control means responsive to said sensing means, one of said control assemblies establishing a fluid pressure condition in the drive means for said clamp halting movement thereof at its raised position and maintaining said clamp immobile at that position, and the other of said control assemblies establishing a fluid pressure condition in the drive means for said knife halting movement thereof at its raised position and maintaining said knife immobile in that position.

4. In a cutter of the type described, the combination of a work table adapted to receive a pile of material to be cut, a clamp member movable from a terminal raised position to a lower position in engagement with the pile of material, knife means movable from a terminal raised position in a guillotine-type cutting stroke to sever said pile, a pair of pressure fluid operated drive means each having a movable output member, one of said output members effecting movement of said clamp into and out of engagement with said pile, the other of said output members effecting movement of said knife during a cutting stroke, means connected to supply pressure fluid to each side of each of said output members for effecting movement thereof, control assemblies including sensing means and control means responsive to said sensing means, said control assemblies establishing a fluid pressure condition in the drive means for said clamp and knife halting movement thereof at the raised position and maintaining said members immobile at that position.

5. In a paper cutter of the type described, the combination of a clamp member movable between a terminal raised position and a clamping position engaging a pile to be cut, a knife member movable in a guillotine-type cutting stroke from a terminal position to sever said pile, pressure fluid operated drive means having output means movable to raise and lower said clamp member, power means connected to move said knife to sever the pile, means including valve means connected to supply pressure fluid to said drive means in response to a first signal for moving said output means in a first direction and responsive to a second signal for supplying fluid pressure to move said output means in a second direction, means for transmitting said signals to said valve means, a control assembly including means to sense the position of said clamp member, a servo valve included in said control assembly having open and closed positions and an intermediate position between said open and closed positions, said servo valve being in the closed position as said valve means operates in response to said second signal for maintaining sufficient fluid pressure in said drive means to move said output means in a second direction raising said clamp member, said sensing means connected to urge said servo valve into said intermediate position as said clamp member reaches said terminal position for halting movement thereof, said sensing means in the absence of a second signal to said valve means urging said servo valve toward the closed position as said clamp is lowered for creating sufficient pressure in said drive means to move said clamp member to said terminal position, and means maintaining said valve means supplying pressure to said drive means until said knife member clears the pile during movement toward the terminal position thereof.

References Cited in the file of this patent
UNITED STATES PATENTS

| | | |
|---|---|---|
| 2,192,778 | Stacy | Mar. 5, 1940 |
| 2,245,080 | Pendleton | June 10, 1941 |
| 2,309,944 | Flowers | Feb. 2, 1943 |
| 2,558,071 | Castle et al. | June 26, 1951 |
| 2,825,404 | Barley | Mar. 4, 1958 |